United States Patent [19]

Galliker

[11] 4,314,321

[45] Feb. 2, 1982

[54] OZONIZER FEEDING DEVICE

[75] Inventor: Josef Galliker, Wettingen, Switzerland

[73] Assignee: BBC Brown, Boveri & Company Limited, Baden, Switzerland

[21] Appl. No.: 143,554

[22] Filed: Apr. 25, 1980

[30] Foreign Application Priority Data

Apr. 30, 1979 [CH] Switzerland ............... 4031/79

[51] Int. Cl.³ ............................................ H02M 5/00
[52] U.S. Cl. .................................................... 363/10
[58] Field of Search ............... 307/220 R; 328/15, 20; 363/9, 10, 11, 148, 149, 151

[56] References Cited

U.S. PATENT DOCUMENTS 3,678,367  7/1972  McMurray ..................... 363/10
3,931,563  1/1976  Stacey ............................. 321/7
3,999,112 12/1976  Gyugyi ........................... 363/10

*Primary Examiner*—William M. Shoop

*Attorney, Agent, or Firm*—Oblon, Fisher, Spivak, McClelland & Maier

[57] ABSTRACT

An ozonizer power feeding device comprising a multiphase power source having at least one terminal for each phase, a thyristor circuit coupled to the terminals of the power source and including at least two thyristors for each phase connected at one side thereof in an anti-parallel configuration to a respective terminal of the source, a transformer having at least one primary coil coupled to the other sides of the anti-parallel connected thyristors and a secondary coil adapted to be connected to an ozonizer for feeding power to the ozonizer, and a joint control unit coupled to each of the thyristors for controlling the conduction time thereof in dependence on the waveforms provided at the terminals of the source in order to derive a composite waveform applied to the transformer primary, wherein the composite waveform has a high frequency than that of any of the phases of the power source, thereby increasing ozone production which is proportional to the frequency of the applied power.

4 Claims, 10 Drawing Figures

|    | 11 | 12 | 13 | 14 | 15 | 16 | 21 | 22 | 23 | 24 | 25 | 26 |     |
|----|----|----|----|----|----|----|----|----|----|----|----|----|-----|
| I  | X  |    |    |    | X  |    |    |    |    |    |    |    | +U  |
| II |    |    |    |    |    |    |    | X  |    | X  |    |    | −Z  |
| III| X  |    |    |    |    | X  |    |    |    |    |    |    | +V  |
| IV |    |    |    |    |    |    |    |    | X  | X  |    |    | −Z  |
| V  |    | X  |    |    |    | X  |    |    |    |    |    |    | +V  |
| VI |    |    |    |    |    |    |    |    | X  |    | X  |    | −X  |
| VII|    | X  |    | X  |    |    |    |    |    |    |    |    | +W  |
| VIII|   |    |    |    |    |    |    | X  |    |    | X  |    | −X  |
| IX |    |    | X  | X  |    |    |    |    |    |    |    |    | +W  |
| X  |    |    |    |    |    |    |    | X  |    |    |    | X  | −Y  |
| XI |    |    | X  |    | X  |    |    |    |    |    |    |    | +U  |
| XII|    |    |    |    |    |    |    |    |    | X  |    | X  | −Y  |

OZONIZER FEEDING DEVICE

BACKGROUND OF THE INVENTION

1. Field of the Invention

This invention relates to a device for feeding power to an ozonizer in such a way as to maximize ozone output.

2. Description of the Prior Art

It is known that ozone production increases for a given ozonizer with a higher operating frequency. In the book Ullmann, Enzyklopadie der Chemie (Encyclopedia of Chemistry), Urban & Schwarzenberg, 3rd Edition, Munich, 1964, volume 15, page 101, FIG. 7, the ozone output of an ozone tube is graphically represented as a function of the frequency. When proceeding from a system frequency of 50 Hz, approximately 2.3 times the amount of ozone is abtained at a frequency of 150 Hz and approximately 3.7 times the amount at a frequency of 300 Hz. Similarly favorable conditions are obtained when proceeding from another system frequency (for example, 60 Hz).

An ozonizer feeding device is described in the U.S. Pat. No. 4,051,045 which has a thyristor bridging circuit and operates with an essentially rectangular wave shape. This device is very complicated and must include several auxiliary units in order to be operational.

SUMMARY OF THE INVENTION

Accordingly, the objects of this invention are to provide a novel ozonizer feeding device which permits an increase in the ozone output and thus an economical ozone production using simple technical means.

These and other objects are achieved according to the invention by providing a new and improved ozonizer power feeding device provided with a high-voltage transformer and including a thyristor circuit in which at least two thyristors are connected in an anti-parallel configuration between at least one system terminal each for one phase (R, S, T) and the high-voltage transformer and to a joint control unit. In this way the frequency of the ozonizer power feeding can reach several times the system frequency, for example, three times or six times the amount with a three-phase system yielding higher ozone production as a result of higher frequencies. Thus, approximately 2.3 times the amount of ozone can be produced with three times the system frequency or approximately 3.7 times the amount with six times the system frequency.

As noted above, due to the power feeding thyristor circuit according to the invention, an advantage is obtained that, in turn, positive and negative sections of the voltage amplitude can be connected of the (mostly three) phase from the multi-phase/three-phase current system. These result in a one-phase alternating current of three times the system frequency so that approximately 2.3 times the amount of ozone is produced in comparison with the system frequency. Steep voltage increases are obtained which have a particularly advantageous effect on the ozone production. The one-phase alternating voltage is brought to the desired ozonizer voltage with the help of a high-voltage transformer in the known manner.

Further advantages are realized according to the invention by providing a thyristor control unit including a blocking period setting member for setting the ignition points of the thyristors so that the ozone production can be regulated.

Also, by arranging the thyristors Y-connected in the case of a three-phase system, the device is only equipped with six thyristors. When no neutral conductor is available, the thyristors are delta-connected and diodes are inserted in the circuit for current return. Alternatively, in the delta-connected device, instead of providing current return diodes, two thyristors are provided for each half period of the supply voltage, thereby doubling the number of thyristors required while eliminating the diodes altogether.

In another embodiment wherein the system power transformer is provided with zigzag interconnections between the connection of the thyristors and the system terminals for individual phases, there is realized a six-fold increase in system power feeding frequency, resulting in an additional increase in ozone production.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
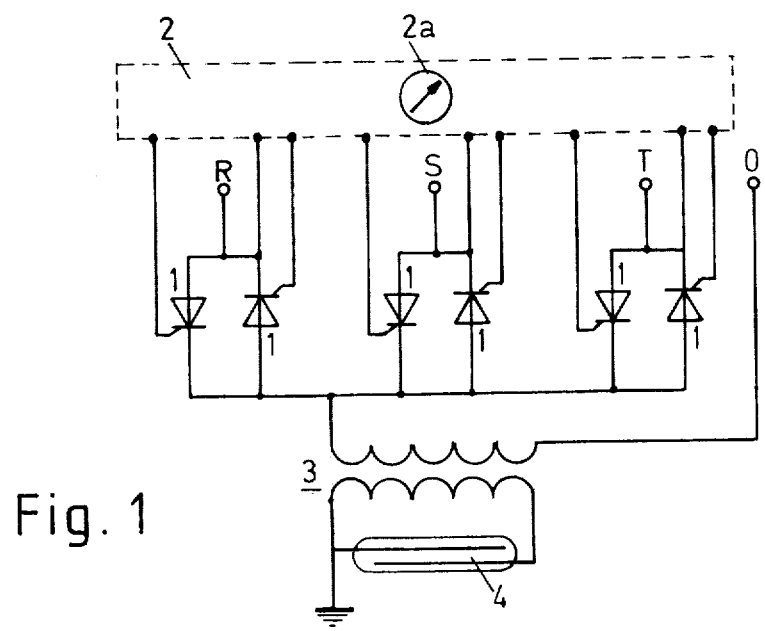
FIG. 1 is a schematic circuit diagram of an ozonizer feeding device according to the invention implemented in a Y-connection.

Referring now to the drawings, wherein like reference numerals designate identical or corresponding parts throughout the several views, and more particularly to FIG. 1 thereof, there are shown three pairs of thyristors 1 Y-connected in an anti-parallel circuit. The center of the Y-connection is connected with one end of the primary winding of the high voltage transformer 3. The other end of this primary winding is connected to a neutral conductor 0. The pairs of thyristors 1 are connected with the system phases R, S, T. A control unit 2 with a blocking period setting member 2a serves the purpose of controlling the thyristors 1 and is integrated into the system supply on the phase application side. The secondary winding of the high voltage transformer 3 is connected and grounded with a known ozonizer 4.

Figure 2:
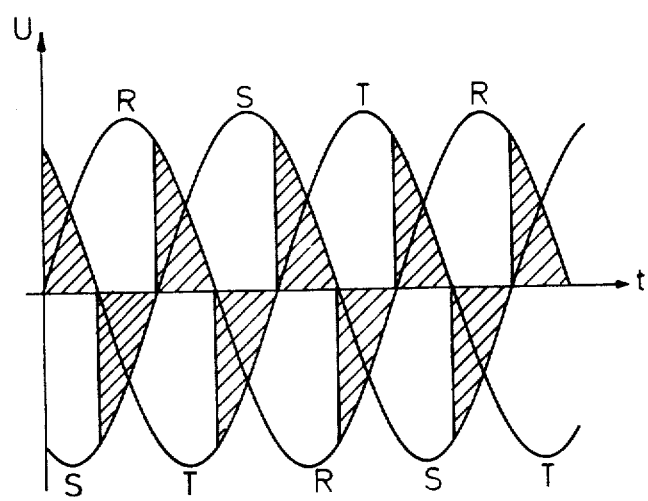
FIG. 2 is a graph illustrating the voltage amplitude versus time waveforms produced in the device according to FIG. 1.

In FIG. 2, the course of the voltages U of the phases R, S, T is represented as a function of time t. Sections of the voltage amplitudes are shown hatched which are produced with the thyristors 1 from FIG. 1 from the three-phase voltage. As can be noticed from FIG. 2, the frequency of the sections corresponds to three times the system frequency whereby favorable, steep voltage increases are obtained.

Figure 3:
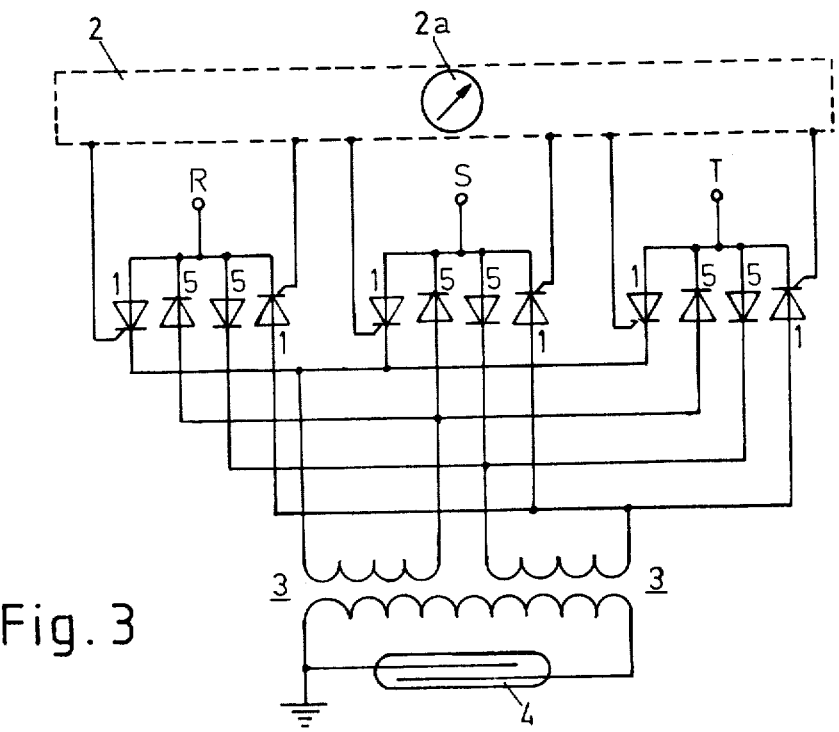
FIG. 3 is a schematic circuit diagram of a device according to the invention implemented in a delta connection and provided with additional diodes.

The delta connection according to FIG. 3 contains additional diodes 5 provided for current return. No neutral conductor is available for this design. The primary winding of the high voltage transformer 3 is divided into two separate windings.

Figure 4:
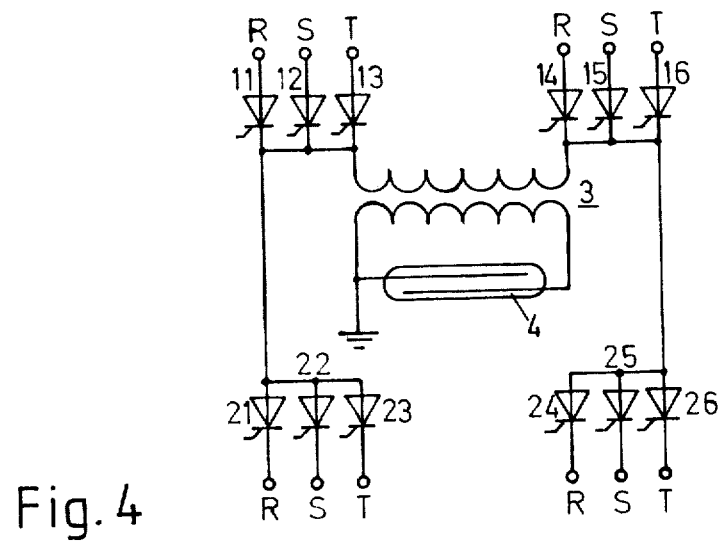
FIG. 4 is a schematic circuit diagram of another exemplified embodiment of the device of the invention implemented in a connection with twice the number of thyristors and with no diodes.
Figures 5, 6:
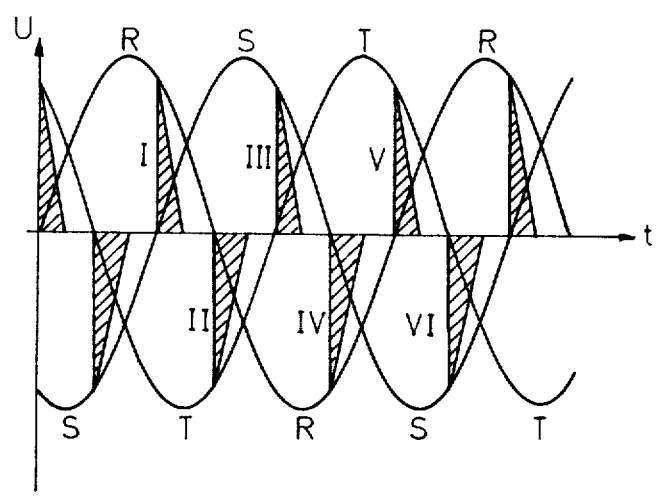
FIG. 5 is a table illustrating from which of the thyristors shown in FIG. 4 feeding pulses are output.
FIG. 6 is a graph illustrating the voltage amplitude versus time waveforms produced with the device according to FIG. 4 and according to the table of FIG. 5.

The design according to FIG. 4 is for a three-phase system with twelve thyristors 11 to 16 and 21 to 26. During each half period always two thyristors must be simultaneously connected. An exemplified sequence of the connections is contained in FIG. 5. The sections of the voltage amplitudes developed in this manner are shown in FIG. 6. When comparing FIGS. 4 to 6, it can be noticed that the first section I developed through the simultaneous switching of thyristors 11 and 25, the second section through the switching of thyristors 14 and 23, etc. These short pulses and the steep rise in time have a positive effect on the degree of efficiency.

Figure 7A:
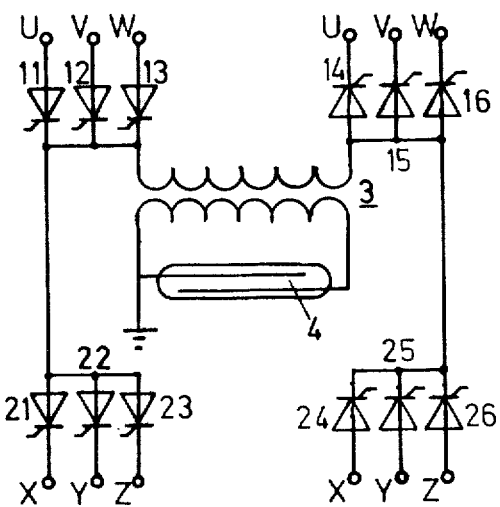
FIGS. 7a and 7b are schematic circuit diagrams illustrating an additional exemplified device according to the invention, in which the circuit according to FIG. 7a is supplied through a system transformer according to FIG. 7b.
Figure 7B:
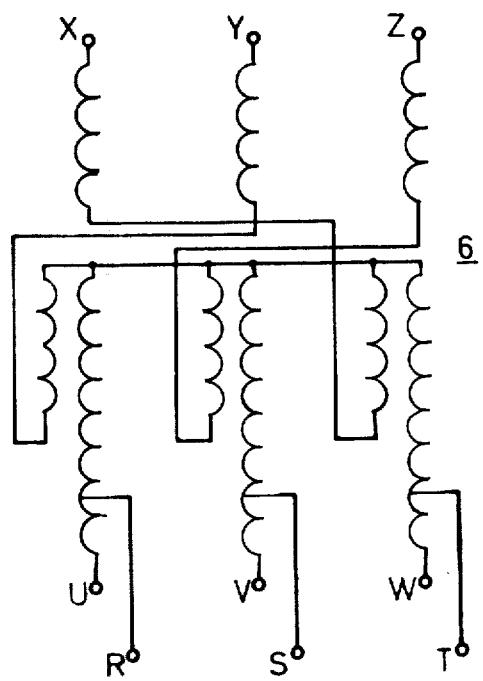

Six times the system frequency is obtained with the design according to FIGS. 7a and 7b. In order to form these six phases, a power transformer 6 is required with an actually known zigzag connection. This transformer 6 is connected to the system phases R, S, T and has output phases U, V, W and X, Y, Z. The first group of the phases U, V, W is shifted towards each other by 120° as it is the case in a normal three-phase system. Also the phases X, Y, Z of the second group are shifted toward each other by 120°. However, the shifting of the two groups of phases towards each other amounts only to 30°. The system phases R, S, T are used for the thyristor switching with an increased voltage. The system phases R, S, T have, however, the same phase relationship as the output phases U, V, W. The thyristors 11 to 16 and 21 to 26 are controlled in such a way that the phases U, V, W make the current flow from the left to the right in the primary winding of the high voltage transformer 3. This current forms the positive amplitudes. In the opposite current direction, the negative amplitudes result from the phases X, Y, Z.

Figures 8, 9:
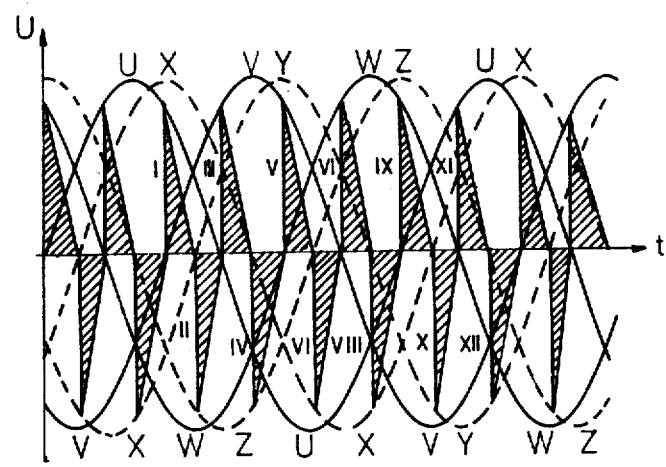
FIG. 8 is a table illustrating the output pulses generated by the system shown in FIGS. 7a and 7b.
FIG. 9 is a graph illustrating the voltage amplitude versus time waveforms which are produced with the device according to FIGS. 7a and 7b and according to the table of FIG. 8.

The table according to FIG. 8 shows the sequence of the switching of the individual thyristors for the design in accordance with FIGS. 7a and 7b in a manner similar to that already shown by the table according to FIG. 5 for the design according to FIG. 4.

It can be noticed from the sections of the voltage amplitudes shown in FIG. 9 that 6 times the system frequency is reached in this manner.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An ozonizer power feeding device comprising:
   a multiphase power source having at least one terminal for each phase;
   a thyristor circuit coupled to the terminals of said source, said thyristor circuit comprising at least two thyristors for each phase connected at one side thereof in an anti-parallel configuration to the respective terminal of said source;
   a transformer having at least one primary coil coupled to the other sides of said anti-parallel connected thyristors and a secondary coil adapted to be connected to an ozonizer for feeding power to said ozonizer;
   a joint control unit coupled to each of said thyristors for controlling the conduction time thereof in dependence on the waveforms provided at the terminals of said source;
   said transformer comprising a single primary coil having two sides;
   said thyristor circuit comprising,
   a first set of respective pairs of anti-parallel connected thyristors coupled between the terminals of said power source and one side of said primary coil, and
   a second set of respective pairs of anti-parallel connected thyristors coupled between the terminals of said power source and the other side of said primary coil;
   wherein the first and second sets of thyristors are provided for switching during selected portions of positive and negative half-periods of each power phase; and
   a power transformer comprising plural zigzag connected windings inserted between the terminals of said multiphase power source and the anti-parallel connected thyristors.

2. A device according to claim 1, wherein said control unit comprises:
   means for setting the blocking period of the thyristors of said thyristor circuit.

3. A device according to claim 1, further comprising: the other sides of the thyristors connected in a Y-configuration.

4. A device according to claim 1, further comprising: the other side of said thyristors delta connected; and said thyristor circuit comprising current return diodes for each thyristor coupled between said at least one transformer primary coil and said terminals of said multi-phase power source.

* * * * *